Figure 1:
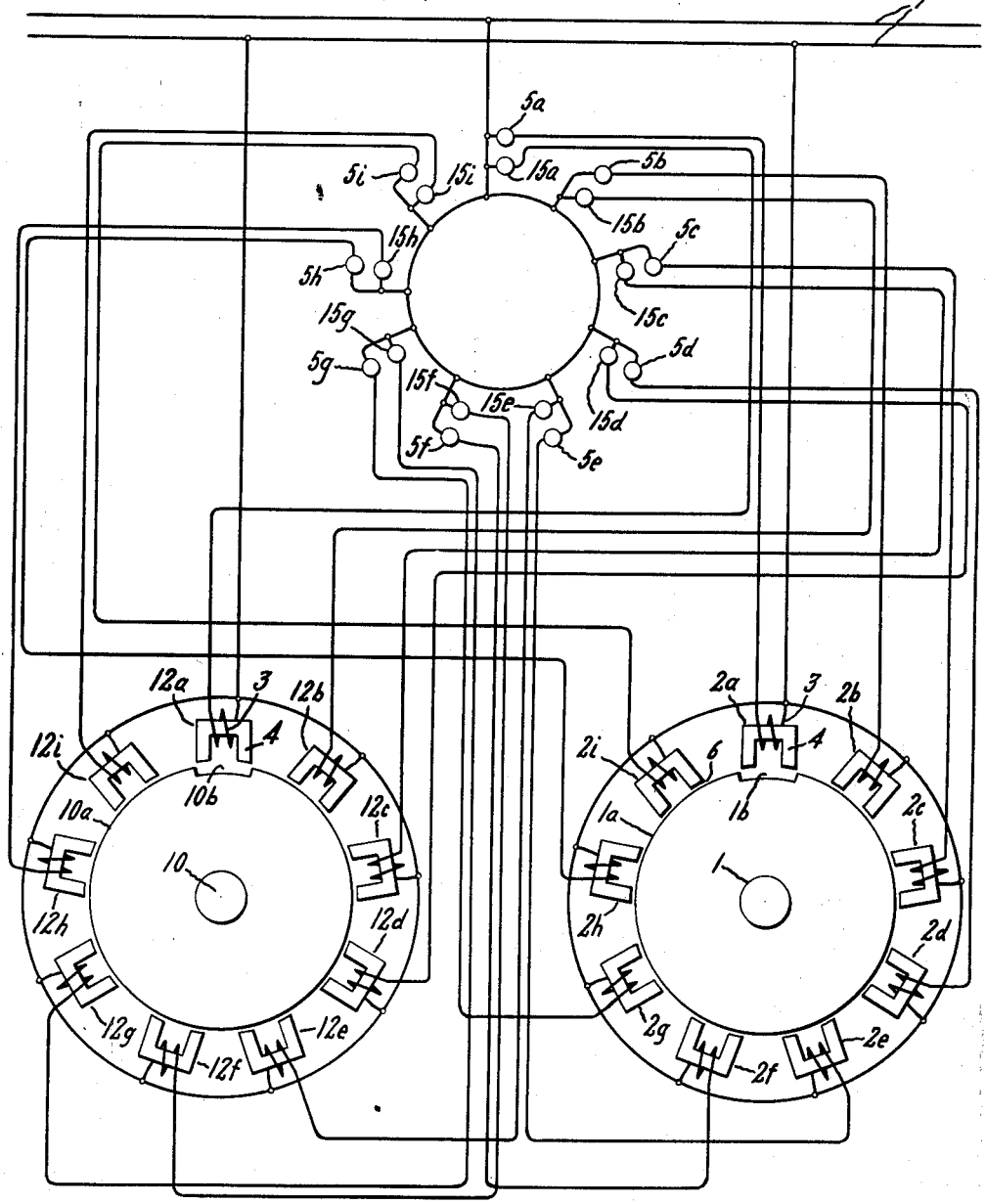

June 28, 1960  E. S. SAMPSON  2,943,307
SHAFT ROTATION INDICATOR
Filed Feb. 19, 1957  2 Sheets-Sheet 1

INVENTOR.
ERNEST S. SAMPSON
BY Kiess
HIS ATTORNEY

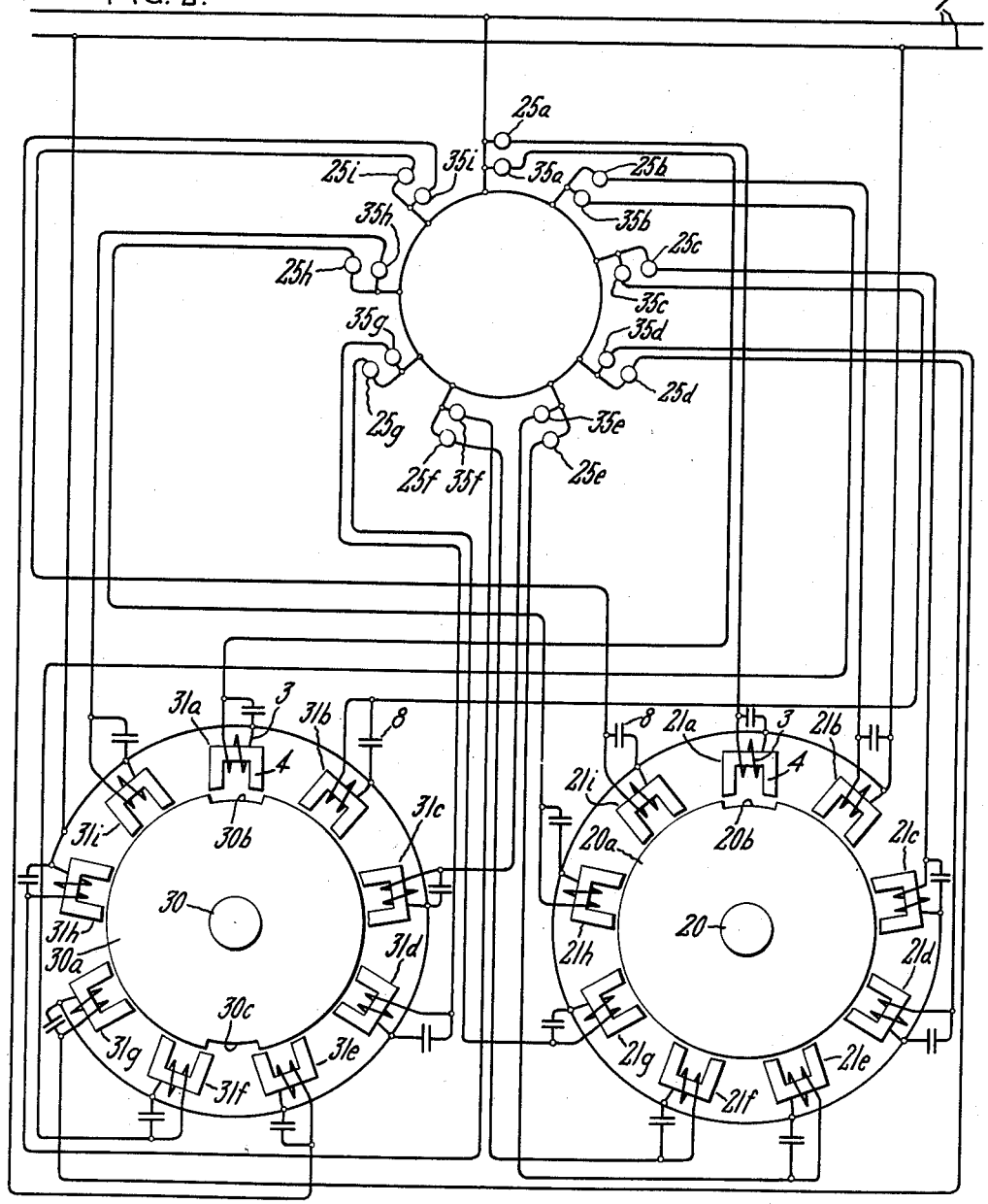

United States Patent Office 2,943,307
Patented June 28, 1960

2,943,307

SHAFT ROTATION INDICATOR

Ernest S. Sampson, Schenectady, N.Y., assignor to General Electric Company, a corporation of New York Filed Feb. 19, 1957, Ser. No. 641,081

7 Claims. (Cl. 340—268)

This invention relates to a shaft rotation indicator and particularly to a device which indicates the rotation and relative phase relationship of two slowly rotating turbine-generator rotors.

During turbine startup, the turbine-generator rotor is slowly rotated by a motor operated gear mechanism commonly called a "turning gear." Continuous rotor rotation is necessary at this time to prevent non-uniform rotor expansion which would result from uneven heating if the rotor remained stationary when steam is locally applied for sealing or other purposes. The damage and delay caused by an undiscovered stoppage of the rotor for any appreciable length of time while on turning gear makes it necessary that the rotor movement be known at all times during this period.

In "cross-compound" turbines, which consist of a high pressure turbine-generator unit and a separate low pressure turbine-generator unit, the two units are electrically connected at low speeds by impressing a D.-C. voltage on each generator. The rotors are then brought up to speed together by the admission of steam and increasing the D.-C. voltage impressed across the generators. In order to achieve the above sequence of events smoothly and bring the generators into operating condition, it is necessary that the rotational phase relationship be maintained within 40 electrical degrees. If the rotors are not properly "phased," the application of "field voltage" may result in overloading the turning gear and damaging the generator rotors due to uneven heating.

It has been found from experience that when the two rotors of a cross-compound turbine are more than 40 electrical degrees out of phase, the application of field voltage to the generators will not bring the rotors into phase. Attempts to do this have resulted in the overloading and stalling of the turning gears and damaging the rotors in the manner previously mentioned.

Heretofore, is has been the practice to actually watch the rotors to see if they are rotating and to impress a "field" on the generators to bring the rotors into phase in a "hit and miss" fashion. This method requires additional men to watch the turbines and often results in delays due to rotor stoppage when the field is applied to the generators when they are more than 40 electrical degrees out of phase.

Accordingly, it is an object of this invention to provide an improved shaft rotation indicating means for showing, at a remote location, the motion of a slowly rotating shaft.

A further object is to provide a mechanism for indicating the motion of two independently rotating generator rotors and the phase relationship therebetween.

A specific object is to provide means for indicating the phase relationship between two shafts where one is rotating at one half the speed of the other.

Other objects and advantages will become apparent from the following description taken in connection with the accompanying drawings in which;

Fig. 1 is a schematic circuit diagram of mechanism for indicating the rotation of and phase relationship between two shafts which are rotating at the same speed; and Fig. 2 is a schematic circuit diagram of a modification in which one shaft is rotating at one half the speed of the other.

Generally stated, the invention is practiced by providing variable impedance means around the periphery of a rotating shaft, providing the shaft with means to periodically vary the impedance means, and coupling a signal means in series with each inductor. The signal means are then caused to vary in accordance with the change in impedance caused by shaft rotation to indicate shaft movement. Where it is desired to indicate the rotation of two shafts and the phase relationship therebetween, separate signal means are arranged in such a manner that the relative positions between the means for periodically varying the impedance can be readily ascertained.

Referring now to Fig. 1, there is illustrated a shaft 1 on which is mounted a disk 1a of magnetic material. The disk 1a is circular with the exception of a recess 1b having a depth of approximately ¼-inch cut therein. Spaced around the periphery of disk 1a at intervals of about 40 degrees are nine variable inductors 2a, 2b, etc., which inductors are spaced from the disk 1a by an air gap 6 on the order of .025 inch. It is obvious that a different number of inductors could be used if desired. Each of the inductors consist of a coil 3 surrounding a magnetic core member 4. The coils, cores, air gaps and disks constitute in conjunction with the recessed portion 1b, the impedances which are varied in synchronism with the rotating shaft, the precise manner of operation being explained in detail later.

Located at a convenient place remote from the shaft is an indicator comprising a ring of nine lamps 5a, 5b . . . 5i, spaced at 40 degree intervals to correspond with the spacing of the respective inductors 2a . . . 2i. The inductors 2a . . . 2i are connected with lamps 5a . . . 5i, respectively across the A.-C. voltage supply 7 to form nine separate circuits each containing an inductor and a lamp in series. The lamps are successively lighted to indicate the shaft rotation in a manner which will be obvious from the following description of the method of operation. With a current flowing in the coils 3, each of the inductors forms a magnetic circuit with the disk member 1a. The magnetic circuit formed by the inductor 2a consists of coil 3, core 4, air gap 6, recess 1b, air gap 6, and core 4. Each of the other magnetic circuits consists of a coil 3, core 4, air gap 6, magnetic disk 1a, air gap 6 and core 4. The first magnetic flux path, including the recess 1b, has a higher magnetic reluctance than the magnetic flow path in each of the other magnetic circuits due to the lower permeability of the air in recess 1b as compared with the permeability of the magnetic material in the similar space adjacent each of the inductors 2b, 2c, etc.

The relatively high reluctance of the magnetic circuit including the inductor 2a and recess 1b results in a relatively small inductance and therefore a relatively small impedance of the inductor 2a. As a consequence, the major portion of the voltage drop impressed across the series circuit containing the inductor 2a and lamp 5a appears across the lamp 5a to cause it to burn brightly. The relatively lower reluctance of the other circuits containing the inductors 2b . . . 2i, disposed opposite a solid portion of the magnetic disk 1a results in a relatively higher inductance and thus a high impedance of the inductors 2b . . . 2i. In these circuits, the greater portion of the voltage drop, for example that impressed across the series circuit containing the inductor 2b and lamp 5b appears across the inductor 2b and an insufficient voltage drop is available to light the lamp 5b. Thus when the lamp 5a is lighted, the other lamps 5b, 5c, etc., are dimmer, or completely dark. In this arrangement a 60 cycle 110 volt supply at 7 is sufficient to accomplish the desired results.

During rotation of the shaft 1, the lamps 5a, 5b, etc., are successively lighted when their respective inductors 2a, 2b, etc., are located opposite the recess 1b. Thus, the rotation of the shaft 1 is indicated by a travelling light signal in a ring of lamps.

Illustrated adjacent shaft 1 is a second shaft 10. Mounted on shaft 10 is a magnetic disk 10a in which is cut a recess 10b similar to recess 1b in disk 1a. Located around disk 10a are nine equally spaced inductors 12a, 12b, etc., each comprising a coil 3 and an iron core member 4. The inductors 12a, 12b, etc., are connected in series across the voltage supply 7 with a ring of nine lamps 15a, 15b, etc., to form nine separate circuits each including an inductor and a lamp in series in a manner similar to that described with respect to shaft 1. The ring of lamps 15a, 15b, etc., is concentrically disposed relative to the lamp ring formed by lamps 5a, 5b, etc., and the lamps 5a, 15a; 5b, 15b; etc., are radially spaced relative to each other. The ring of lamps 15a, 15b, etc., provides visual indication of the rotation of shaft 10 in the same manner as set forth in detail with respect to shaft 1. The reasons for the concentric relationship between lamp rings 5 and 15 will be discussed more fully hereinafter.

In addition to indicating shaft rotation, my novel mechanism can be arranged to indicate the position of the respective generator rotors relative to their stator windings, and with this information the phase relationship between the rotors can be ascertained. This is readily accomplished by orienting the disks 1 and 10 so that the grooves 1b, 10b are similarly located with respect to the windings of their respective generators. (This relationship is usually determined during installation of the turbine-generator, by trial and error, and the disks 1, 10 are then adjusted to place the recesses 1b, 10b in similar locations with respect to the electrical patterns of the generator windings.) Thus, when the shafts rotate, the electrical phase relationship between the two generator rotors is indicated by the relative position of the lights in the two concentric rings of lamps.

This arrangement will be more readily apparent from the following method of operation.

The two rotors 1, 2 of a cross-compound turbine generator unit are slowly rotated at the same speeds by their individual turning gear mechanisms (not shown). The rotation of the rotors 1, 2 will be indicated by a travelling light in each lamp row 5, 15 respectively. The moving lights will indicate the location of recesses 1b, 10b and thus the phase relationship between the two generator rotors. One of the turning gear mechanisms is then slowed down, or stopped and restarted, until the moving lights in the concentric rows of signal lamps are moving around in step or phase (or at least within 40 electrical degrees of each other). The field voltage may then be applied to the generators, and the turbines brought up to full speed.

Thus, the trial and error method previously employed for determining when the generator field voltage should be applied is replaced by a signal system made of simple components having long life which gives clear visual indication of the phase relationship between two generator rotors.

While the embodiment disclosed in Fig. 1 performs satisfactorily when the shafts are rotating at the same speed, the modification illustrated in Fig. 2 is employed when the mechanism is used for two rotors in which one is running at twice the speed of the other. In such a situation the faster rotor is disposed in a 2-pole generator and the slower rotor is located in a 4-pole generator. Thus the output frequency of each generator is the same. In this embodiment, shaft 20 is illustrated as having mounted thereon a magnetic disk 20a in which a recess 20b is cut. Surrounding the disk 20a in a manner identical to that around disk 1a in Fig. 1 are nine inductors 21a, 21b, etc. Each of the inductors 21a, 21b, etc., is connected in series with a lamp 25a, 25b, etc., respectively, in the same way as illustrated in Fig. 1.

Thus, rotation of shaft 20 is indicated by a rotating light in the ring of lamps 25a, 25b, etc., in the same manner as set forth in the description of Fig. 1. The embodiment shown in Fig. 2 differs from that of Fig. 1 in that the second shaft 30 is turned at one-half the speed of shaft 20. Thus, in order to visually indicate the phase relationship between such shafts, it is necessary to modify the arrangement of Fig. 1 as follows.

Mounted on shaft 30 is a circular disk 30a in which is cut diametrically disposed recesses 30b, 30c. Spaced around the periphery of disk 30a at intervals of 40 degrees are nine variable inductors 31a, 31b, etc. These inductors like those surrounding shafts 1, 10, and 20 consist of a coil 3 and a core member 4. Each of the inductors are connected up in series with a lamp in a ring of lamps consisting of lamps 35a, 35b, etc. For reasons which will be obvious from the method of operation, the individual series circuits consist of the following combinations of lamps and inductors. The individual series circuits consist of lamp 35a, inductor 31a; lamp 35b, inductor 31f; lamp 35c, inductor 31b; lamp 35d, inductor 31g; lamp 35e, inductor 31c; lamp 35f, inductor 31h; lamp 35g, inductor 31d; lamp 35h, inductor 31i; lamp 35i, inductor 31e. The rotation of shaft 30 changes the impedance in each series circuit when either notch 30b or 30c is located opposite an inductor in the manner as set forth in the description of Fig. 1. It should be noted that when shaft 30 is operating at one half the speed of shaft 20, an odd number of evenly spaced inductors must be used. Therefore, when one recess is opposite an inductor the other recess will be located between inductors and thus only one light will be lighted at a time. With this design, a 20 degree rotation of shaft 30, which is 40 electrical degrees since shaft 30 is the rotor of a 4-pole generator, can be compared with the equivalent electrical degree movement of shaft 20.

Also, used in this embodiment is a capacitor 8 in parallel with each inductor 21a, 21b, etc., and 31a, 31b, etc. The capacitor is designed to "tune out" the inductance when the respective grooves 20b, 30b, 30c are not coincident with the inductors in each circuit. When tuned this way, the change in reluctance as provided by groove 1b causes a larger change in impedance across the inductor than when the inductor is not tuned. Thus, the capacitor makes the light dimmer when the groove is not opposite the inductor in series with the aforementioned lamp, and accordingly, when the groove is opposite an inductor, the lamp in series with the inductor appears brighter with respect to the adjacent lights than when a capacitor is not used. Capacitors could also be used in the arrangement illustrated in Fig. 1 if desired.

It remains to note that the disks 30a and 20a are adjusted so that when a pair of radially aligned lamps are lighted, i.e., 25a, 35a, the two rotors are in electrical phase and the field voltage can be applied to electrically connect the rotors.

This mechanism disclosed in Fig. 2 operates in the following manner.

The turning gear mechanism employed during turbine start-up rotates shaft 20 at 3 r.p.m. and shaft 30 at 1½ r.p.m. The rotation of shaft 20 will be indicated by a travelling light in the ring of lamps 25a, 25b, etc. This sequence occurs as notch 20b moves past inductors 21a, 21b, etc., in that order. Since shaft 30 is rotating at 1½ r.p.m., it rotates only 20 degrees when shaft 20 is moving through a 40 degree angle and thus recess 30b is located intermediate inductors 31a, 31b and recess 30c is located opposite inductor 31f. However, since inductor 31f is in series with lamp 35b, lamp 35b will light up along with lamp 25b when the shafts 20, 30 are in phase. During a second equivalent time interval, lamp 25c is lighted since recess 20b is located opposite inductor 21c and lamp 35c is lighted since recess 30b is disposed opposite inductor 31b. This operation continues in such a manner that while shaft 20 rotates through 360 degrees to sequentially light the complete outer row of lamps 25a, 25b, etc., the shaft 30 is rotating 180 degrees and sequentially lights the complete inner row of lamps 35a, 35b, etc. If the shafts 20, 30 are out of phase they can be stopped and restarted by controlling the turning gear mechanisms to bring them within the prescribed phase relationship before a field voltage is applied to the generators.

Thus the invention provides novel means for detecting movement of a rotating member, and for indicating the phase relationship between two shafts rotating at the same speed, or at a known fixed speed ratio.

While two embodiments of the invention have been described in detail herein, it will be obvious to those skilled in the art that many changes and substitutions of equivalents might be made. For example, the magnetic disks defining a recess may be replaced with nonmagnetic disks containing a magnetic portion to produce a rotating dark spot in a ring of lights instead of a rotating light.

It is, of course, desired to cover by the appended claims all such modifications as fall within the true spirit and scope of the invention.

What I claim as new and desire to secure by Letters Patent of the United States is:

1. A device for indicating shaft rotation comprising a plurality of inductance means disposed adjacent to and peripherally spaced around a rotating shaft, each inductance means forming a magnetic circuit with said shaft and comprising a core member, and a coil causing flux changes in said core, means on said shaft to successively vary the reluctance of each magnetic circuit and therefore the impedance of the inductance in each circuit when said means passes each of said inductances, and lamp means coupled in series to each inductance, the lamp means being disposed in a ring and being successively actuated in accordance with the successive variation of the impedance of each inductance means caused by shaft rotation to simulate shaft rotation, whereby a remote visual indication of the location and angular velocity of the inductance varying means will be provided.

2. Mechanism for indicating shaft rotation comprising a magnetic member connected to a shaft, a plurality of inductance means disposed adjacent to and peripherally spaced around the shaft to form a plurality of magnetic circuits with the shaft, the magnetic member defining a recess for successively varying the impedance of each inductance when disposed opposite an inductance, a lamp coupled in series with each inductance, the lamps being disposed in a ring, whereby they are successively actuated during shaft rotation in accordance with the change in impedance of each inductance to indicate the location and angular velocity of the magnetic member.

3. A device for indicating shaft rotation and phase relationship of two rotating shafts, the combination comprising a first inductance means disposed adjacent to and forming a first magnetic circuit with a first shaft, first means on said first shaft to periodically vary the reluctance of the first magnetic circuit and thus the inductance of said first circuit, second inductance means disposed adjacent to and forming a second magnetic circuit with a second shaft, second means on said second rotating shaft to periodically vary the reluctance and therefore the inductance of the second magnetic circuit, and indicating means responsive to the changes in inductance in each magnetic circuit to indicate the movement of each shaft and the relative positions of said first and second reluctance varying means, whereby the phase relationships between the two rotating shafts are shown.

4. A shaft rotation indicator and phase indicating device for two rotating shafts comprising a plurality of first inductances spaced around the periphery of a first shaft, first means on the first shaft to successively vary the impedance of the first inductances in accordance with the rotation of the first shaft, a plurality of second inductances spaced around the periphery of a second shaft, second means on the second shaft to successively vary the impedance of the second inductances in accordance with the rotation of the second shaft, and indicating means coupled to and actuated by the first and second inductances in accordance with the changes in impedance to simulate rotation of said first and second shafts and the position of said first and second means to thereby indicate shaft rotation and the phase relationship between the two shafts.

5. A device for indicating shaft rotation and the phase relationship between two rotating shafts comprising a plurality of first inductances spaced around the periphery of a first shaft, a plurality of second inductances spaced around the periphery of a second shaft, first means on the first shaft for successively varying the impedance of the first inductances in accordance with rotation of the first shaft, second means on the second shaft for successively varying the impedance of the second inductances in accordance with rotation of the second shaft, visual indicating means connected in series with each inductance, the indicating means including a first ring of lights responsive to the successive variation in the impedance change in said first inductances to simulate rotation of the first shaft, a second ring of lights responsive to the successive variation in the impedance change in said second inductances to simulate rotation of the second shaft, the first and second rows of lights being concentrically disposed whereby the phase relationship between said first and second shaft is indicated by the comparison between the position of said first and second impedance varying means.

6. A device in accordance with claim 5 in which the first and second means each comprise a magnetic disk member defining a recess for successively varying the reluctance of the magnetic circuit formed between the inductances and the shafts adjacent thereto during rotation of the shafts.

7. A device for indicating shaft rotation and the phase relationship of a first shaft rotating at a first speed and a second shaft rotating at twice the speed of the first shaft, the combination comprising a plurality but odd number of first inductances equally spaced around the periphery of the first shaft, an equal number of second inductances equally spaced around the periphery of the second shaft, lamp means connected in series with each inductance, the lamp means connected to said first inductances being disposed in a first ring of lamps, the lamp means connected to said second inductances being disposed in a second ring of lamps concentric with said first ring, first means on the first shaft for successively varying the impedance of the first inductances to actuate the lamps in said first ring of lamps to simulate rotation of the first shaft, second means on the second shaft to vary the impedance of the second inductances, the series circuits connecting the second ring of lamps and second inductances being constructed and arranged whereby said second ring of lamps will simulate rotation of said second shaft at the same speed as the first whereby the phase relationship of the first and second shafts is indicated by the relative position of said first and second impedance varying means.

References Cited in the file of this patent

UNITED STATES PATENTS

| | | |
|---|---|---|
| 2,609,143 | Stibitz | Sept. 2, 1952 |
| 2,740,110 | Trimble | Mar. 27, 1956 |

FOREIGN PATENTS

| | | |
|---|---|---|
| 878,116 | Germany | June 1, 1953 |